(12) United States Patent
Liang et al.

(10) Patent No.: US 11,177,479 B2
(45) Date of Patent: Nov. 16, 2021

(54) CURRENT COLLECTOR, ELECTRODE PLATE INCLUDING THE SAME AND ELECTROCHEMICAL DEVICE

(71) Applicant: Contemporary Amperex Technology Co., Limited, Ningde (CN)

(72) Inventors: Chengdu Liang, Ningde (CN); Huafeng Huang, Ningde (CN); Qisen Huang, Ningde (CN)

(73) Assignee: Contemporary Amperex Technology Co., Ltd., Ningde (CN)

( * ) Notice: Subject to any disclaimer, the term of this patent is extended or adjusted under 35 U.S.C. 154(b) by 0 days.

(21) Appl. No.: 16/342,831

(22) PCT Filed: Dec. 5, 2018

(86) PCT No.: PCT/CN2018/119285
§ 371 (c)(1),
(2) Date: Apr. 17, 2019

(87) PCT Pub. No.: WO2019/109928
PCT Pub. Date: Jun. 13, 2019

(65) Prior Publication Data
US 2020/0295377 A1 Sep. 17, 2020

(30) Foreign Application Priority Data
Dec. 5, 2017 (CN) .......................... 201711269253.9

(51) Int. Cl.
*H01M 4/66* (2006.01)
*H01M 10/0525* (2010.01)
*H01M 4/64* (2006.01)

(52) U.S. Cl.
CPC ............. *H01M 4/667* (2013.01); *H01M 4/64* (2013.01); *H01M 4/661* (2013.01); *H01M 4/663* (2013.01);
(Continued)

(58) Field of Classification Search
None
See application file for complete search history.

(56) References Cited

U.S. PATENT DOCUMENTS

| 2004/0126663 A1 | 7/2004 | Sudano et al. |
| 2006/0105243 A1* | 5/2006 | Okamura ................ H01M 4/64 429/234 |

(Continued)

FOREIGN PATENT DOCUMENTS

| CN | 104916809 | 9/2015 |
| CN | 106654285 | 5/2017 |

(Continued)

OTHER PUBLICATIONS

MacDonald (MacDonald et al., "Latest advances in substrates for flexible electronics", Journal of the SID 15/12, 2007, 1074-1083) (Year: 2007).*

(Continued)

*Primary Examiner* — Jeremiah R Smith
(74) *Attorney, Agent, or Firm* — Panagos Kennedy PLLC; Bill Panagos; Linda Kennedy (57) ABSTRACT

The present disclosure relates to the field of battery and, in particular, relates to a current collector, an electrode plate including the current collector, and an electrochemical device. The current collector of the present disclosure includes an insulation layer and a conductive layer. The insulation layer is used to support the conductive layer. The conductive layer is used to support an electrode active material layer and is located on at least one surface of the insulation layer. The insulation layer has a density smaller than that of the conductive layer. The insulation layer has a thickness of D1 satisfying $1\ \mu m \leq D1 \leq 10\ \mu m$. The conductive (Continued)

layer has a thickness of D2 satisfying 200 nm≤D2≤1.5 μm. The insulation layer has a tensile strength greater than or equal to 150 MPa.

17 Claims, 5 Drawing Sheets

(52) U.S. Cl.
CPC ............ H01M 4/665 (2013.01); H01M 4/668 (2013.01); H01M 10/0525 (2013.01)

(56) References Cited

U.S. PATENT DOCUMENTS

| | | | |
|---|---|---|---|
| 2008/0182174 A1* | 7/2008 | Carlson | H01M 10/4235 429/251 |
| 2018/0198132 A1 | 7/2018 | Liang et al. | |
| 2018/0294456 A1* | 10/2018 | Kang | H01M 2/166 |
| 2018/0301709 A1* | 10/2018 | Qiu | C23C 14/205 |

FOREIGN PATENT DOCUMENTS

| | | |
|---|---|---|
| CN | 107123812 | 9/2017 |
| CN | 107154499 | 9/2017 |
| CN | 107221676 | 9/2017 |
| CN | 07369810 | 11/2017 |
| CN | 107369810 | 11/2017 |
| EP | 3 367 485 A1 | 8/2018 |
| EP | 3 389 122 A1 | 10/2018 |
| JP | 2003031224 | 1/2003 |
| JP | 2006024727 | 1/2006 |

OTHER PUBLICATIONS

Wikipedia (Wikipedia's "Polyvinyl Chloride" page as published on Jan. 5, 2017; https://web.archive.org/web/20170105095754/https://en.wikipedia.org/wiki/Polyvinyl_chloride) (Year: 2017).*
Japanese Office Action for JP 2019516234.
European Search Report for 18865372.9-1108/ 3522274 PCT/CN2018119285.
First Office Action in CN related case App 2017112692539 dated Mar. 3, 2021.

* cited by examiner

CURRENT COLLECTOR, ELECTRODE PLATE INCLUDING THE SAME AND ELECTROCHEMICAL DEVICE

CROSS-REFERENCE TO RELATED DISCLOSURES

The present application is based on International Application No. PCT/CN2018/119285, filed on Dec. 5, 2018, which claims priority to Chinese Patent Disclosure No. 201711269253.9, filed on Dec. 5, 2017 and entitled "CURRENT COLLECTOR, ELECTRODE PLATE THEREOF AND ELECTROCHEMICAL DEVICE", the contents of which are incorporated herein by reference in their entireties.

TECHNICAL FIELD

The present disclosure relates to the field of battery and, in particular, relates to a current collector, an electrode plate including the current collector, and an electrochemical device.

BACKGROUND

Lithium ion batteries have been widely used in electric vehicles and consumer electronics due to their advantages such as high energy density, high output power, long cycle life, and low environmental pollution. With continuous increasing of the application range of lithium ion batteries, requirements for weight energy density and volume energy density of lithium ion batteries are also increasing.

In order to obtain a lithium ion battery with the high weight energy density and volume energy density, the lithium ion battery is generally improved by: (1) selecting a positive or negative electrode material having a high specific discharge capacity; (2) optimizing the mechanical design of the lithium ion battery to minimize its volume; (3) selecting a positive or negative electrode plate having the high compaction density; and (4) reducing weight of various parts of the lithium ion battery.

The current collector is generally improved by selecting a lighter or thinner current collector such as a punched current collector or a plastic current collector coated with a metal layer, etc.

For the plastic current collector coated with a metal layer, improvements on many aspects are needed so as to obtain a current collector with good conductivity, a light weight, and a small thickness.

In view of this, the present disclosure is proposed.

SUMMARY

In a first aspect of the present disclosure, a current collector is provided, which can have the good conductivity, weight energy density and mechanical strength. The current collector includes: an insulation layer and a conductive layer. The insulation layer is used to support the conductive layer. The conductive layer is used to support an electrode active material layer and is located on at least one surface of the insulation layer.

The insulation layer has a density smaller than a density of the conductive layer. The insulation layer has a thickness of D1, where 1 μm≤D1≤10 μm. The conductive layer has a thickness of D2, where 200 nm≤D2≤1.5 μm.

The insulation layer has a tensile strength greater than or equal to 150 MPa.

The conductive layer has a resistivity smaller than or equal to $8.0 \times 10^{-8} \Omega \cdot m$.

In a second aspect of the present disclosure, an electrode plate is provided. The electrode plate includes: the current collector according to the first aspect of the present disclosure and an electrode active material layer formed on a surface of the current collector.

In a third aspect of the present disclosure, an electrochemical device is provided. The electrochemical device includes: a positive electrode plate, a separator, and a negative electrode plate. The positive electrode plate and/or the negative electrode plate are the electrode plate according to the second aspect of the present disclosure.

The technical solution of the present disclosure has at least the following beneficial effects.

The current collector of the present disclosure is light relative to a conventional current collector, so that the weight energy density of the battery can be effectively increased, thereby obtaining a light-weight current collector. The light-weight current collector of the present disclosure further has good mechanical strength and conductivity, so that the current collector has a good mechanical stability, a good operating stability, a good service life, and a good rate performance.

The electrode plates and the electrochemical device according to the present disclosure not only have a high weight energy density, but also have good electrochemical performance such as rate performance, cycle performance, etc., and at the same time have excellent operating stability and service life.

in which:
1—positive electrode plate;
10—positive current collector;
101—positive insulation layer;
102—positive conductive layer;
1021—positive conductive layer body,
1022—positive protective layer;
11—positive active material layer;
2—negative electrode plate
20—negative current collector;
201—negative insulation layer;
202—negative conductive layer;
2021—negative conductive layer body;
2022—negative protective layer;
21—negative active material layer.

DESCRIPTION OF EMBODIMENTS

Hereafter, the present disclosure will be further described in combination with specific embodiments. It should be understood that these embodiments are only for illustrating the present disclosure and do not limit the scope of the present disclosure.

Embodiments of the present disclosure provide a current collector including an insulation layer and a conductive layer. The insulation layer is used to support the conductive layer, and the conductive layer is used to support an electrode active material layer and located on at least one surface of the insulation layer.

The current collector can be a positive current collector or a negative current collector, and structures thereof are illustrated in FIGS. 1-4.

Figure 1:
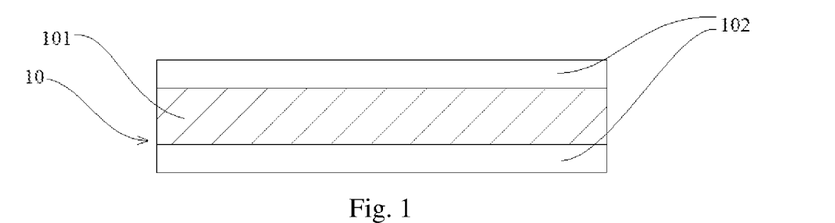
FIG. 1 is a structural schematic diagram of a positive current collector according to an embodiment of the present disclosure.
Figure 2:
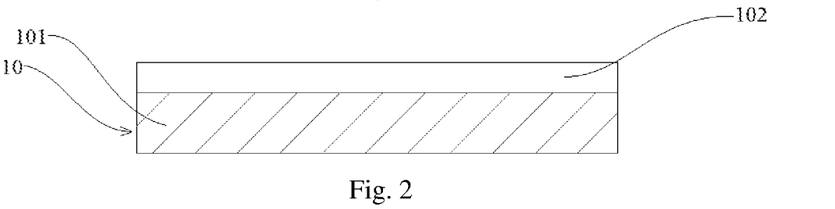
FIG. 2 is a structural schematic diagram of a positive current collector according to another embodiment of the present disclosure.

FIGS. 1 and 2 are structural schematic diagrams of a positive current collector according to an embodiment of the present disclosure. As shown in FIGS. 1 and 2, a positive current collector 10 includes a positive insulation layer 101 and a positive conductive layer 102, on which a positive active material is to be coated to prepare a positive electrode plate. Here, in FIG. 1, the positive conductive layer 102 is provided on each of two opposite surfaces of the positive insulation layer 101, so that both surfaces of the positive current collector are coated with the positive active material. In FIG. 2, a positive conductive layer 102 is provided on one surface of the positive insulation layer 101, so only one surface of the positive current collector 10 is coated with the positive active material.

Figure 3:
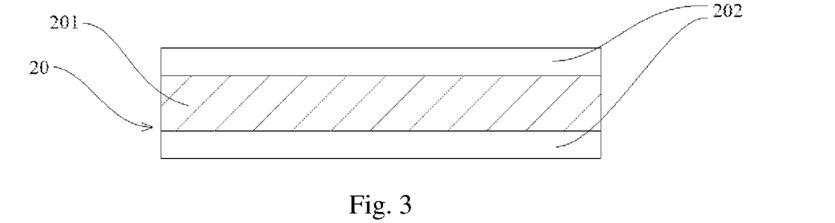
FIG. 3 is a structural schematic diagram of a negative current collector according to an embodiment of the present disclosure.
Figure 4:
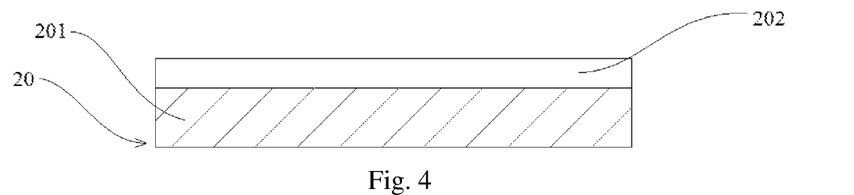
FIG. 4 is a structural schematic diagram of a negative current collector according to another embodiment of the present disclosure.

FIG. 3 and FIG. 4 are structural schematic diagrams of a negative current collector according to an embodiment of the present disclosure. As shown in FIGS. 3 and 4, a negative current collector 20 includes a negative insulation layer 201 and a negative conductive layer 202, on which a negative active material is to be coated to prepare a negative electrode plate. Here, in FIG. 3, the negative conductive layer 202 is provided on each of two opposite surfaces of the negative insulation layer 201, so that both surfaces of the negative current collector are coated with the negative active material. In FIG. 2, a negative conductive layer 202 is provided on one surface of the negative insulation layer 201, so one surface of the negative current collector 20 is coated with the negative active material.

In the following, properties of the current collector according to the embodiments of the present disclosure will be described in details.

The current collector according to the embodiments of the present disclosure includes an insulation layer and a conductive layer. Since the insulation layer is generally made of an organic material and the conductive layer is generally made of a denser metal or other conductive material, the density of the insulation layer is smaller than that of the conductive layer, i.e., the weight energy density has been improved with compared to the conventional current collectors such as an aluminum foil or a copper foil. Further, the insulation layer has a thickness of D1, where $1~\mu m \leq D1 \leq 10~\mu m$, and the conductive layer has a thickness of D2, where $200~nm \leq D2 \leq 1.5~\mu m$. It can be seen from the thickness ranges that a ratio of the thickness of the conductive layer to the thickness of the insulation layer is 1:50 to 1:5, so in the current collector of the present disclosure, the insulation layer having a small density accounts its majority, and the weight energy density can be significantly increased.

In the current collector according to the embodiments of the present disclosure, the insulation layer serves as a support, and has a tensile strength greater than or equal to 150 MPa, thereby further ensuring the mechanical strength of the current collector. The conductive layer serves to collect current, and has a resistivity smaller than or equal to $8.0 \times 10^{-8} \Omega \cdot m$ (at 20° C.), thereby further ensuring the conductivity of the current collector. In this way, a light-weight current collector with well improved properties can be achieved.

The resistivity of the conductive layer can be measured by a contact resistance measurement method.

Therefore, the applicant has found through a large number of experiments that when $1~\mu m \leq D1 \leq 10~\mu m$ and $200~nm \leq D2 \leq 1.5~\mu m$, the tensile strength of the insulation layer is greater than or equal to 150 MPa, and the resistivity of the conductive layer is smaller than or equal to $8.0 \times 10-8\Omega$ (at 20° C.), an lithium ion battery made of the current collector has less polarization, better cycle life, and higher weight energy density.

In the current collector of the embodiments of the present disclosure, the bonding force between the insulation layer and the conductive layer is F satisfying ≥400 N/m.

The bonding force F was be measured as follows. A current collector in which a conductive layer is arranged on a surface of an insulation layer was used as a sample to be measured. Under room temperature and normal pressure conditions, 3M double-sided adhesive was evenly attached to a stainless steel plate, and then a test sample was evenly attached to the double-sided adhesive in a width of 2 cm. The conductive layer of the sample to be measured was peeled off from the insulation layer by using a high-speed puller. The maximum pulling force was read according to a data chart of the pulling force and the displacement, and the read value was divided by 0.02 (unit N) to calculate the fastness of the metal layer, i.e., the bonding force F (N/m) between the insulation layer and the conductive layer of the current collector.

In the embodiments of the present disclosure, the bonding force F between the insulation layer and the conductive layer of the current collector is larger than or equal to 400 N/m, so that a more firm and stable bond is formed between the insulation layer and the conductive layer and thus the insulation layer can play a better supporting role. Under the requirements of the range of the bonding force, the thickness of the insulation layer can be reduced to a maximum extent while achieving the supporting effect of the insulation layer, thereby further increasing the volume energy density of the battery.

[Conductive Layer]

Compared with the conventional metal current collector, in the current collector according to the embodiments of the present disclosure, the conductive layer serves to conduct and collect current so as to provide electrons to the electrode active material layer. The thickness of the conductive layer is D2 satisfying: 200 nm≤D2≤1.5 μm. When the conductivity of the conductive layer is poor or the thickness of the conductive layer is too small, the internal resistance of the battery would be larger and the polarization would be larger. When the thickness of the conductive layer is too large, it cannot be sufficient to improve the weight energy density and volume energy density of the battery.

In the embodiments of the present disclosure, the upper limit of the thickness D2 of the conductive layer may be 1.5 μm, 1.4 μm, 1.3 μm, 1.2 μm, 1.1 μm, 1 μm, or 900 nm. The lower limit of the thickness D2 of the conductive layer may be 800 nm, 700 nm, 600 nm, 500 nm, 450 nm, 400 nm, 350 nm, 300 nm, or 200 nm. The thickness of the conductive layer D2 can be in a range of consisting of any one upper limit and any one lower limit. Preferably, 500 nm≤D2≤1.5 μm, and more preferably, 500 nm≤D2≤1.2 μm.

According to the embodiments of the present disclosure, the resistivity of the conductive layer is smaller than or equal to $8.0\times10^{-8}$ Ω·m (at 20° C.). Further, the resistivity of the conductive layer can be in a range from $1.6\times10^{-8}$ Ω·m to $8.0\times10^{-8}$ Ω·m (at 20° C.).

Since the density of the conductive layer is greater than that of the insulation layer, the smaller thickness D2 of the conductive layer can facilitate reducing the weight of the current collector and improving the energy density of the battery. However, when D2 is too small, the effect of conducting and collecting current of the conductive layer would be deteriorated, thereby affecting the internal resistance, polarization, cycle life, etc. of the battery. Therefore, when the resistivity of the conductive layer is not greater than $8.0\times10^{-8}$ Ω·m (at 20° C.), and 200 nm≤D2≤1 μm, the conductive layer can not only effectively reduce the weight of the current collector, but also make the battery have the better rate performance, charge and discharge performance, etc. More preferably, 200 nm≤D2≤900 nm.

Optionally, the conductive layer is made of a material selected from a group consisting of a metal conductive material, a carbon-based conductive material, and combinations thereof, the metal conductive material may be selected from a group consisting of aluminum, copper, nickel, titanium, silver, nickel-based alloy, aluminum-based alloy, copper-based alloy, and combinations thereof, and the carbon-based conductive material may be selected from a group consisting of graphite, acetylene black, graphene, carbon nanotube, and combinations thereof.

The conductive layer can be formed on the insulation layer by means of at least one of mechanical rolling, bonding, vapor deposition, and electroless plating. The vapor deposition is preferably physical vapor deposition (PVD). Preferably, the physical vapor deposition is at least one of evaporation deposition and sputtering deposition. The evaporation deposition is preferably at least one of vacuum evaporation, thermal evaporation deposition, and electron beam evaporation method (EBEM). The sputtering deposition is preferably magnetron sputtering.

[Insulation Layer]

In the current collector according to the embodiments of the present disclosure, the conductive layer serves to conduct and collect current so as to provide electrons to the electrode active material layer, and the insulation layer plays a role of supporting and protecting the conductive layer. The insulation layer has a thickness of D1, where 1 μm≤D1≤10 μm. Reducing the thickness of the insulation layer can improve the weight energy density of the battery. However, if the thickness of the insulation layer is too small, the insulation layer is likely to be broken during the processing process of the electrode plate or the like.

The upper limit of the thickness D1 of the insulation layer may be 10 μm, 9 μm, 8 m, 7 μm, or 6 μm, and the lower limit of the thickness D1 of the conductive layer may be 1 μm, 1.5 μm, 2 μm, 3 μm, 4 μm, or 5 μm. The thickness D1 of the insulation layer can be in a range consisting of any one upper limit and any one lower limit.

In the embodiments of the present disclosure, in order to further guarantee the mechanical strength of the current collector so as to obtain a current collector having good mechanical stability, operating stability and service life, the tensile strength of the insulation layer is not smaller than 150 MPa.

Further, optionally, the tensile strength of the insulation layer may be in a range from 150 MPa to 400 MPa.

The testing method for the tensile strength is performed according to GB/T 1040.3-2006.

Further, optionally, in addition to the higher tensile strength, the insulation layer also has good toughness, and its elongation at break is 16% to 120%.

The testing method for the elongation at break is as follows. The sample of the insulation layer is cut into a piece of 15 mm×200 mm. A high-speed puller is used to perform the tensile testing. An initial position is set, and a portion of the sample between clamps has a length of 50 mm, and stretching is performed at a speed of 50 mm/min. The device displacement y (mm) at the time of tensile break is recorded and the elongation at break is finally calculated as (y/50)× 100%.

It can be seen that when satisfying the above conditions, the tensile strength and the elongation at break of the insulation layer can further increase the overall strength of the current collector and reduce the thickness of the insulation layer while satisfying the supporting effect of the insulation layer.

When the insulation layer can sufficiently serve to support the conductive layer, the smaller thickness D1 of the insulation layer is better. However, a smaller thickness of the insulation layer might result in a smaller mechanical strength of the insulation layer, thereby causing the current collector to break during processing or using of the battery. Therefore, when the tensile strength of the insulation layer is not smaller than 150 MPa, it is preferable that 1 µm≤D1≤5 µm. Such an insulation layer can effectively reduce the weight and volume of the current collector, significantly increase the volume energy density of the current collector, and enable the current collector to have a good mechanical strength. More preferably, 1 µm≤D1≤3 µm.

The material of the insulation layer according to the embodiments of the present disclosure is an organic polymer insulation material selected from a group consisting of polyamide (abbreviated as PA), polyethylene terephthalate (abbreviated as PET), polyimide (abbreviated as PI), and polyethylene (abbreviated as PE), polypropylene (abbreviated as PP), polystyrene (abbreviated as PS), polyvinyl chloride (abbreviated as PVC), acrylonitrile butadiene styrene copolymers (abbreviated as ABS), polybutylene terephthalate (abbreviated as PBT), poly-p-phenylene terephthamide (abbreviated as PPA), epoxy resin, ethylene propylene rubber (abbreviated as PPE), polyformaldehyde (abbreviated as POM), phenol-formaldehyde resin, polytetrafluoroethylene (abbreviated as PTFE), silicone rubber, polyvinylidene fluoride (abbreviated as PVDF), polycarbonate (abbreviated as PC), and a combinations thereof.

Further, the thermal shrinkage at 200° C. of the insulation layer according to the embodiments of the present disclosure is not greater than 1.5%. Since the current collector is required to undergo processes such as drying, compaction and so on during processing of the electrode plate, when the tensile strength of the insulation layer is not smaller than 150 MPa and the thermal shrinkage at 200° C. is not greater than 1.5%, the thickness of the insulation layer can be reduced substantially, even reduced to about 1 µm.

[Protective Layer]

In an embodiment of the present disclosure, when the thickness of the conductive layer is small, it is susceptible to chemical corrosion or mechanical damage. Therefore, the conductive layer includes a conductive layer body and a protective layer located on at least one surface of the conductive layer body, such that the operating stability and service life of the current collector can be greatly improved. In addition, the protective layer can enhance the mechanical strength of the current collector.

The protective layer may be selected from a metal protective layer, a metal oxide protective layer or a conductive carbon protective layer. Optionally, the metal is at least one of nickel, chromium, a nickel-chromium alloy, and copper-based alloy (such as a nickel-copper alloy). Optionally, the metal oxide is at least one of aluminum oxide, cobalt oxide, chromium oxide, and nickel oxide. Optionally, the conductive carbon is at least one of conductive carbon black and carbon nanotube.

The nickel-chromium alloy is an alloy formed by a metal nickel and a metal chromium. Optionally, the mass ratio of nickel element to chromium element is 1:99 to 99:1. The copper-based alloy is an alloy formed by adding one or more other elements to a matrix of pure copper. The copper-based alloy is preferably a nickel-copper alloy. Optionally, in the nickel-copper alloy, the mass ratio of nickel element to copper element is 1:99 to 99:1.

Further, a metal protective layer may be arranged on the surface of the conductive layer body, due to the better conductivity of metal materials than that of metal oxides or conductive carbons. Further, the metal material may be selected from a metal nickel or a nickel-based alloy because the metal nickel or nickel-based alloy has good corrosion resistance, high hardness, and good conductivity.

Further, the protective layer in the current collector according to the embodiments of the present disclosure has a thickness of D3 satisfying: D3≤1/10 D2 and 1 nm≤D3≤200 nm. The upper limit of the thickness D3 of the protective layer may be 200 nm, 180 nm, 150 nm, 120 nm, 100 nm, 80 nm, 60 nm, 55 nm, 50 nm, 45 nm, 40 nm, 30 nm, or 20 nm. The lower limit of the thickness D3 of the protective layer may be 1 nm, 2 nm, 5 nm, 8 nm, 10 nm, 12 nm, 15 nm, or 18 nm. The thickness D3 of the protective layer can be in a range of consisting of any one upper limit and any one lower limit. If the protective layer is too thin, it is not enough to protect the conductive layer body; and if the protective layer is too thick, the weight energy density and volume energy density of the battery may be reduced. Preferably, 5 nm≤D3≤200 nm, and more preferably 10 nm≤D3≤200 nm.

FIGS. 5 to 16 each are a structural schematic diagram of a current collector provided with a protective layer according to the embodiments of the present disclosure. FIGS. 5 to 10 are structural schematic diagrams of positive current collectors.

Figure 5:
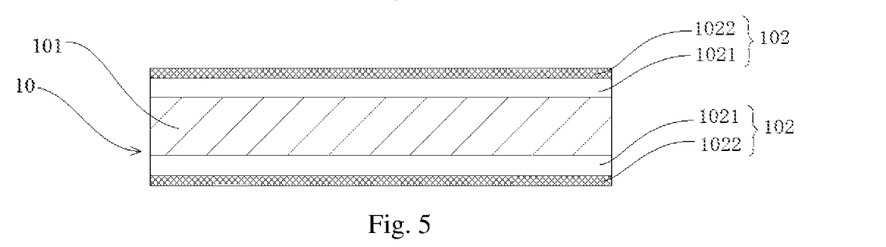
FIG. 5 is a structural schematic diagram of a positive current collector according to another embodiment of the present disclosure.

In FIG. 5, the positive current collector 10 includes a positive insulation layer 101 and positive conductive layers 102 arranged on two opposite surfaces of the positive insulation layer 101. The conductive layer 102 includes a positive conductive layer body 1021 and a positive protective layer 1022 provided on an upper surface of the positive conductive layer body 1021 (i.e., the surface facing away from the positive insulation layer 101).

Figure 6:
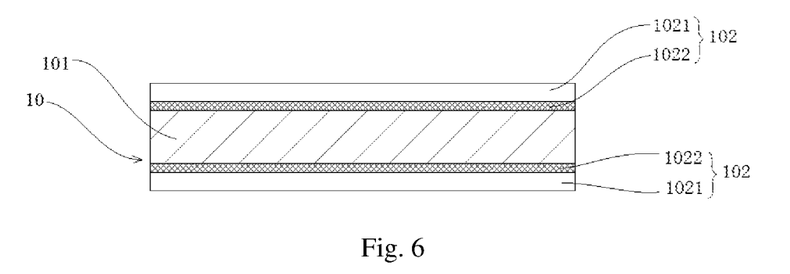
FIG. 6 is a structural schematic diagram of a positive current collector according to another embodiment of the present disclosure.

In FIG. 6, the positive current collector 10 includes a positive insulation layer 101 and positive conductive layers 102 arranged on two opposite surfaces of the positive insulation layer 101. The positive conductive layer 102 includes a positive conductive layer body 1021 and a positive protective layer 1022 provided on a lower upper surface of the positive conductive layer body 1021 (i.e., the surface facing towards the positive insulation layer 101).

Figure 7:
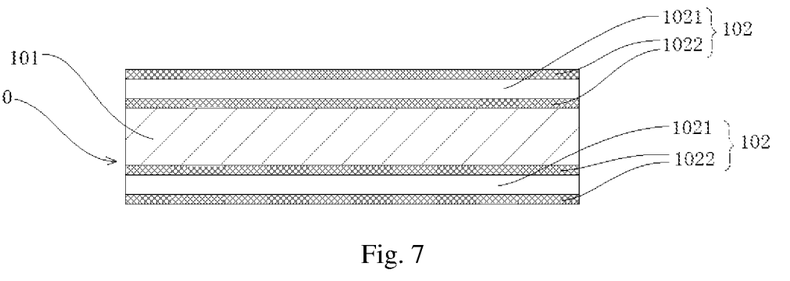
FIG. 7 is a structural schematic diagram of a positive current collector according to another embodiment of the present disclosure.

In FIG. 7, the positive current collector 10 includes a positive insulation layer 101 and positive conductive layers 102 arranged on two opposite surfaces of the positive insulation layer 101. The positive conductive layer 102 includes a positive conductive layer body 1021 and positive protective layers 1022 provided on two opposite surfaces of the positive conductive layer body 1021.

Figure 8:
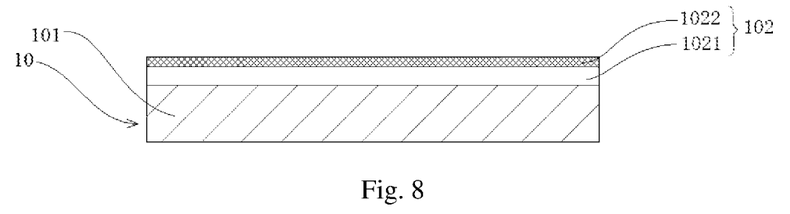
FIG. 8 is a structural schematic diagram of a positive current collector according to another embodiment of the present disclosure.

In FIG. 8, the positive current collector 10 includes a positive insulation layer 101 and a positive conductive layer 102 arranged on one surface of the positive insulation layer 101. The positive conductive layer 102 includes a positive conductive layer body 1021 and a positive protective layer 1022 provided on an upper surface of the positive conductive layer body 1021 (i.e., the surface facing away from the positive insulation layer 101).

Figure 9:
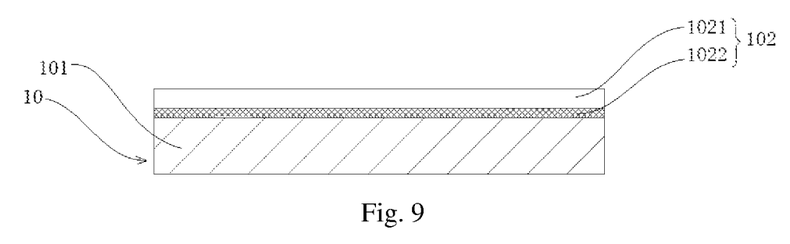
FIG. 9 is a structural schematic diagram of a positive current collector according to another embodiment of the present disclosure.

In FIG. 9, the positive current collector 10 includes a positive insulation layer 101 and a positive conductive layer 102 arranged on one surface of the positive insulation layer 101. The positive conductive layer 102 includes a positive conductive layer body 1021 and a positive protective layer 1022 provided on a lower surface of the positive conductive layer body 1021 (i.e., the surface facing towards the positive insulation layer 101).

Figure 10:
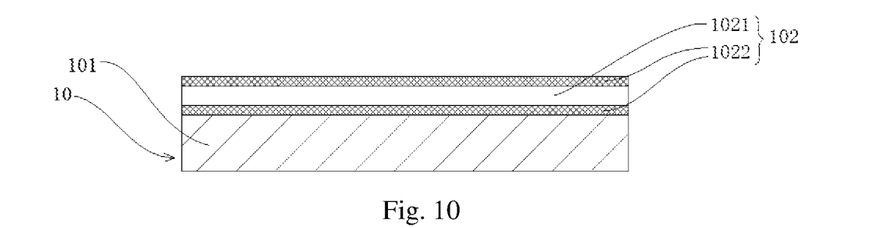
FIG. 10 is a structural schematic diagram of a positive current collector according to another embodiment of the present disclosure.

In FIG. 10, the positive current collector 10 includes a positive insulation layer 101 and a positive conductive layer 102 arranged on one surface of the positive insulation layer 101. The positive conductive layer 102 includes a positive conductive layer body 1021 and positive protective layers 1022 provided on two opposite surfaces of the positive conductive layer body 1021.

Similarly, negative current collectors are illustrated in FIGS. 11 to 16.

Figure 11:
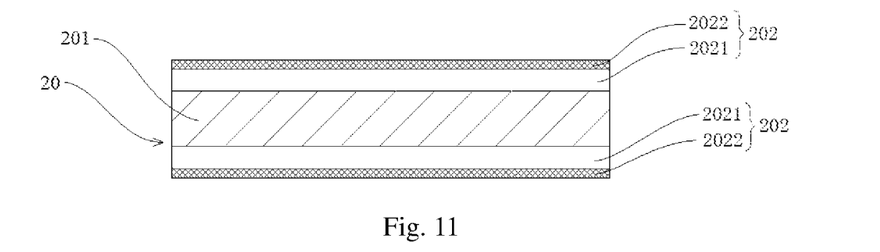
FIG. 11 is a structural schematic diagram of a negative current collector according to another embodiment of the present disclosure.

In FIG. 11, the negative current collector 20 includes a negative insulation layer 201 and negative conductive layers 202 arranged on two opposite surfaces of the negative insulation layer 201. The negative conductive layer 202 includes a negative conductive layer body 2021 and a negative protective layer 2022 provided on an upper surface of the negative conductive layer body 2021 (i.e., the surface facing away from the negative insulation layer 201).

Figure 12:
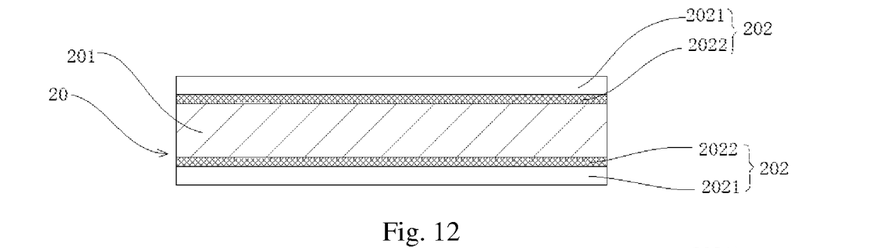
FIG. 12 is a structural schematic diagram of a negative current collector according to another embodiment of the present disclosure.

In FIG. 12, the negative current collector 20 includes a negative insulation layer 201 and negative conductive layers 202 arranged on two opposite surfaces of the negative insulation layer 201. The negative layer 202 includes a negative conductive layer body 2021 and a negative protective layer 2022 provided on a lower upper surface of the negative conductive layer body 2021 (i.e., the surface facing towards the negative insulation layer 201).

Figure 13:
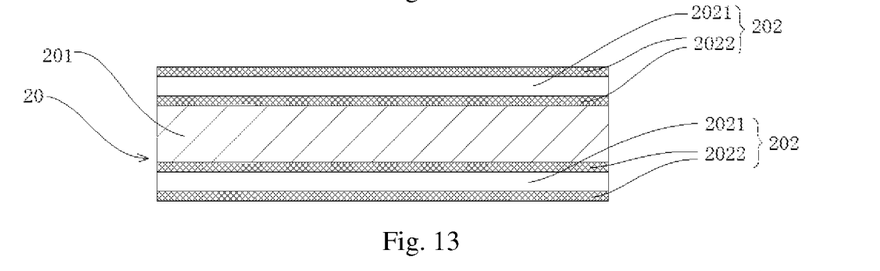
FIG. 13 is a structural schematic diagram of a negative current collector according to another embodiment of the present disclosure.

In FIG. 13, the negative current collector 20 includes a negative insulation layer 201 and negative conductive layers 202 arranged on two opposite surfaces of the negative insulation layer 201. The negative conductive layer 202 includes a negative conductive layer body 2021 and negative protective layers 2022 provided on two opposite surfaces of the negative conductive layer body 2021.

Figure 14:
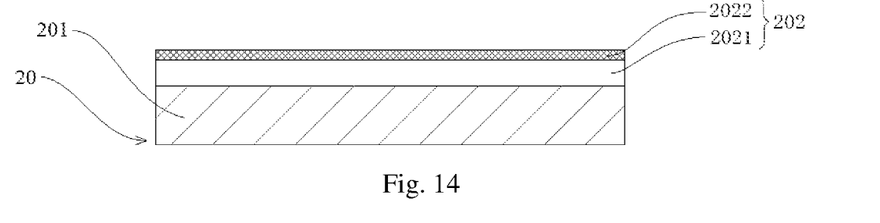
FIG. 14 is a structural schematic diagram of a negative current collector according to another embodiment of the present disclosure.

In FIG. 14, the negative current collector 20 includes a negative insulation layer 201 and a negative conductive layer 202 arranged on one surface of the negative insulation layer 201. The negative conductive layer 202 includes a negative conductive layer body 2021 and a negative protective layer 2022 provided on an upper surface of the negative conductive layer body 2021 (i.e., the surface facing away from the negative insulation layer 201).

Figure 15:
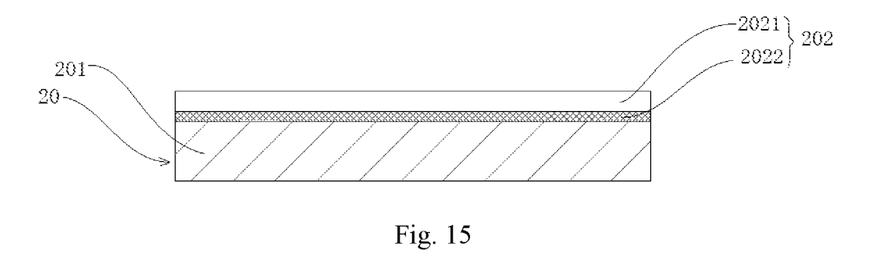
FIG. 15 is a structural schematic diagram of a negative current collector according to another embodiment of the present disclosure.

In FIG. 15, the negative current collector 20 includes a negative insulation layer 201 and a negative conductive layer 202 arranged on one surface of the negative insulation layer 201. The negative conductive layer 202 includes a negative conductive layer body 2021 and a negative protective layer 2022 provided on a lower surface of the negative conductive layer body 2021 (i.e., the surface facing towards the negative insulation layer 201).

Figure 16:
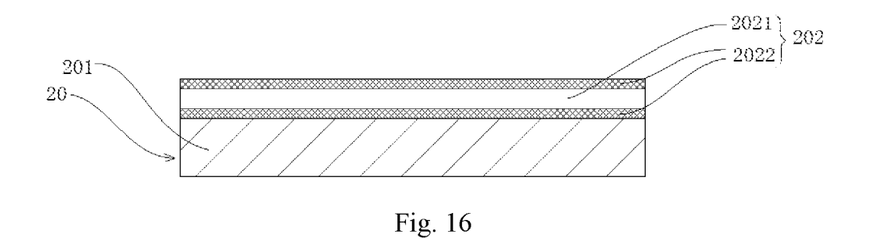
FIG. 16 is a structural schematic diagram of a negative current collector according to another embodiment of the present disclosure.

In FIG. 16, the negative current collector 20 includes a negative insulation layer 201 and a negative conductive layer 202 arranged on one surface of the negative insulation layer 201. The negative conductive layer 202 includes a negative conductive layer body 2021 and negative protective layers 2022 provided on two opposite surfaces of the negative conductive layer body 2021.

Preferably, the protective layer is located on the two opposite surfaces of the conductive layer body. In this way, the operating stability and service life of the current collector can be improved to the utmost extent, and meanwhile, the capacity retention ratio, the cycle life, and the like of the battery can be improved.

The materials of the protective layers located on two opposite surfaces of the conductive layer body may be the same or different, and the thicknesses thereof may be the same or different.

Further, the conductive layer body of the current collector according to the embodiments of the present disclosure can have a metal protective layer provided on each of its two opposite surfaces.

When the protective layer is arranged on a surface of the conductive layer facing away from the insulation layer, it is referred to as an upper protective layer having a thickness of D3'. The upper protective layer can protect the conductive layer body from corrosion, damage and the like, and can improve an interface between the conductive layer body and the electrode active material layer. Since the metal material has high conductivity and strong corrosion resistance, a metal upper protective layer is preferable. The metal upper protective layer can improve the electrical conductivity between the conductive layer body and the electrode active material layer, and reduce the polarization of the electrode.

When the protective layer is arranged on a surface of the conductive layer facing towards the insulation layer, it is referred to as a lower protective layer having a thickness of D3". The lower protective layer can form a complete supporting structure to protect the conductive layer body, thereby better protecting the conductive layer body and preventing the conductive layer from being oxidized, corroded or damaged. Since the metal material has high conductivity and strong corrosion resistance, a metal lower protective layer is preferable.

Further, optionally, the thickness D3' of the upper protective layer is greater than the thickness D3" of the lower protective layer. The increased thickness of the lower protective layer has limited effect on improving the performance of the battery, but may affect the weight energy density of the battery.

Further, optionally, when the upper protective layer and the lower protective layer are both provided, a ratio of the thickness D3" of the lower protective layer to the thickness D3' of the upper protective layer is: $\frac{1}{2} D3' \leq D3" \leq \frac{4}{5} D3'$. Under this ratio, the role of the upper protective layer and the lower protective layer can be better exerted.

The protective layer can be formed on the conductive layer body by means of vapor deposition, an in-situ formation method, a coating method, or the like. With respect to the vapor deposition, physical vapor deposition (PVD) is preferable. Preferably, the physical vapor deposition is at least one of evaporation deposition and sputtering deposition. The evaporation deposition is preferably at least one of vacuum evaporating, thermal evaporation deposition, electron beam evaporation method (EBEM). As regards the sputtering deposition, magnetron sputtering is preferable. The in-situ formation method is preferably an in-situ passivation method, i.e., a method for in-situ forming a metal oxide passivation layer on a metal surface. The coating method is preferably one of roll coating, extrusion coating, blade coating, gravure coating, and the like.

A second aspect of the embodiments of the present disclosure provides an electrode plate including the current collector of the first aspect of the embodiments of the present disclosure and an electrode active material layer formed on a surface of the current collector.

Figure 17:
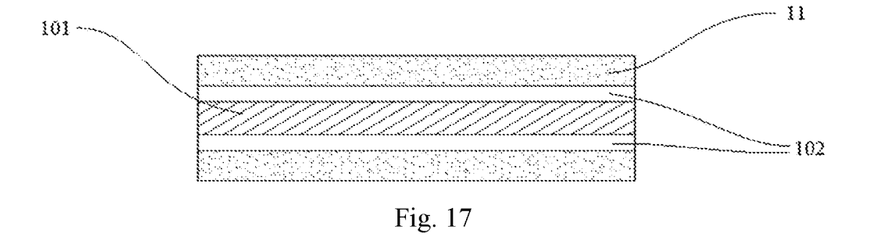
FIG. 17 is a structural schematic diagram of a positive electrode plate according to an embodiment of the present disclosure.
Figure 18:
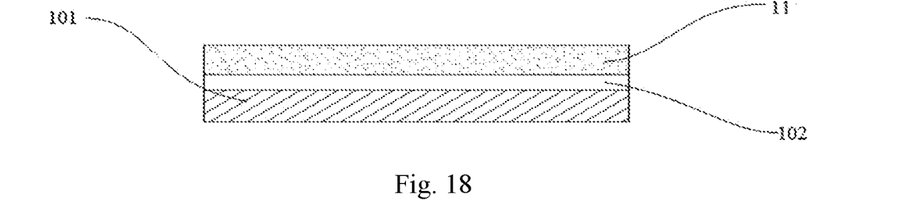
FIG. 18 is a structural schematic diagram of a positive electrode plate according to another embodiment of the present disclosure.

FIGS. 17 and 18 are structural schematic diagrams of a positive electrode plate according to an embodiment of the present disclosure. As shown in FIGS. 17 and 18, the positive electrode plate 1 includes a positive current collector 10 of the present disclosure and a positive active material layer 11 formed on the surface of the positive current collector 10. The positive current collector 10 includes a positive insulation layer 101 and a positive conductive layer 102.

Figure 19:
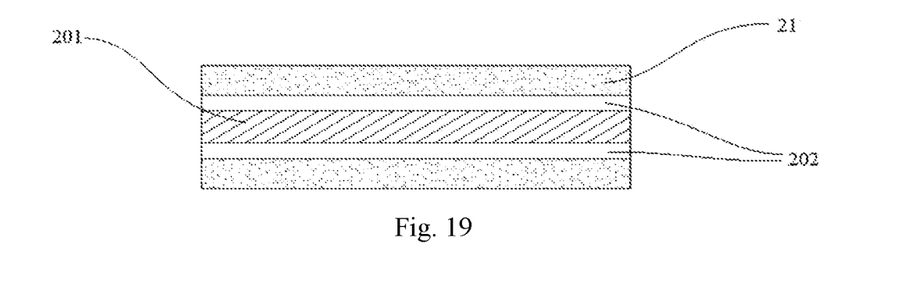
FIG. 19 is a structural schematic diagram of a negative electrode plate according to an embodiment of the present disclosure.
Figure 20:
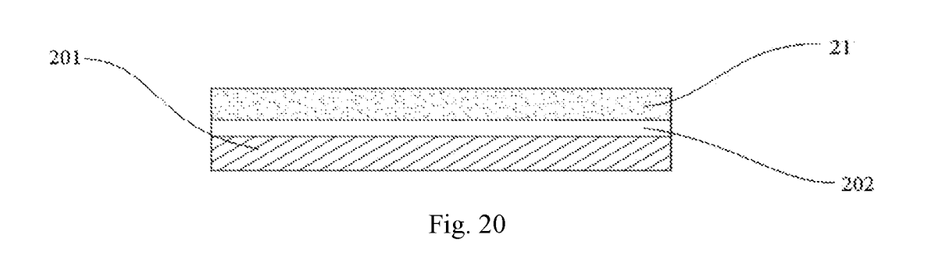
FIG. 20 is a structural schematic diagram of a negative electrode plate according to another embodiment of the present disclosure.

FIGS. 19 and 20 are structural schematic diagrams of a negative electrode plate according to an embodiment of the present disclosure. As shown in FIGS. 19 and 20, the negative electrode plate 2 includes a negative current collector 20 of the present disclosure and a negative active material layer 21 formed on the surface of the negative current collector 20. The negative current collector 20 includes a negative insulation layer 201 and a negative conductive layer 202.

When each of the two surfaces of the insulation layer is provided with a conductive layer, the active material is coated on both surfaces of the current collector, so as to obtain the positive electrode plate and the negative electrode plate as shown in FIGS. 17 and 19, respectively. The positive and negative electrode plates can be directly applied in a battery. When only one surface of the insulation layer is provided with a conductive layer, the active material is coated on a single surface of the current collector, so as to obtain the positive and negative electrode plates, as shown in FIG. 18 and FIG. 20, respectively. The positive and negative electrode plates can be applied in a battery after being bent.

The embodiments of the present disclosure further provide an electrochemical device including a positive electrode plate, a separator and a negative electrode plate.

The positive electrode plate and/or the negative electrode plate are the electrode plate of the above embodiments of the present disclosure. The electrochemical device according to the present disclosure can be of a wound type or laminated type. The electrochemical device according to the present disclosure can be one of a lithium-ion secondary battery, a lithium primary battery, a sodium ion battery, and a magnesium ion battery, but not limited to these.

Embodiments

1. Preparation of Current Collector

An insulation layer having a certain thickness is selected, and a conductive layer having a certain thickness is formed on the surface of the insulation layer by means of vacuum evaporation, mechanical rolling or bonding.

(1) The conditions of the vacuum evaporation are as follows: the insulation layer is placed in a vacuum evaporation chamber after a surface cleaning treatment, a high-purity metal wire in a metal evaporation chamber is melted and evaporated at a high temperature in a range of 1600° C. to 2000° C., the evaporated metal passes through a cooling system in the vacuum evaporation chamber and is finally deposited on the surface of the insulation layer to form the conductive layer. The bonding force F between the insulation layer and the conductive layer was measured to be 230 N/m by the above-described bonding force test method.

(2) The conditions of the mechanical rolling are as follows: a foil of a material used for the conductive layer is placed in a mechanical roller, rolled to a predetermined thickness by applying a pressure in a range of 20 t to 40 t, and then placed on a surface of the insulation layer that has been subjected to a surface cleaning treatment, and finally the both are placed in the mechanical roller, so as to be tightly bonded by applying a pressure in a range of 30 t to 50 t. The bonding force F between the insulation layer and the conductive layer was measured to be 160 N/m by the above-described bonding force test method.

(3) The conditions of the bonding are as follows: a foil of a material used for the conductive layer is placed in a mechanical roller, rolled to a predetermined thickness by applying a pressure in a range of 20 t to 40 t, and then a mixed solution of PVDF and NMP is applied on a surface of the insulation layer that has been subjected to a surface cleaning treatment, and finally the conductive layer having the above predetermined thickness is bonded to the surface of the insulation layer and dried at 100° C. The bonding force F between the insulation layer and the conductive layer was measured to be 180 N/m by the above-described bonding force test method.

Aluminum is selected as the material of the conductive layer of the positive current collector, and copper is selected as the material of the conductive layer of the negative current collector. When a metal aluminum or a metal copper is selected, the resistivity of the conductive layer satisfies being not greater than $8.0 \times 10^{-8} \Omega \cdot m$ (at 20° C.).

The insulation layer in the embodiments of the present disclosure is made of a material having tensile strength not smaller than 150 MPa, elongation at break of 16% to 120% and thermal shrinkage at 200° C. not greater than 1.5%, for example, the marketed materials of PET or PI satisfying such requirements.

The composition and thickness of the current collector in the examples and comparative examples of the present disclosure are shown in Table 1. The conventional positive current collector is an aluminum foil of 12 μm, and the conventional negative current collector is a copper foil of 8 μm. In Table 1, for the positive current collector, a weight percentage of the current collector refers to a ratio of a weight per unit area of the positive current collector to a weight per unit area of the conventional positive current collector. For the negative current collector, a weight percentage of the current collector refers to a ratio of a weight per unit area of the negative current collector to a weight per unit area of the conventional negative current collector.

2. Preparation of Collector Having Protective Layer

There are several manners to form a current collector having a protective layer as follows.

(1) A protective layer is firstly arranged on a surface of the insulation layer by means of vapor deposition or coating, and then a conductive layer body having a certain thickness is formed on the protective layer disposed on the insulation layer by means of vacuum evaporation, mechanical rolling or bonding, so as to prepare a current collector having a protective layer (the protective layer is located between the insulation layer and the conductive layer body). In addition, alternatively, on the basis of the above, another protective layer is further formed on a surface of the conductive layer body facing away from the insulation layer by means of vapor deposition, in-situ formation or coating, so as to prepare a current collector having the protective layers (the protective layers are located on two opposite surfaces of the conductive layer body).

(2) A protective layer is firstly formed on a surface of the conductive layer body by means of vapor deposition, in-situ formation, or coating, and then the conductive layer body provided with the above protective layer is arranged on a surface of the insulation layer by means of mechanical rolling or bonding, and the protective layer is arranged between the insulation layer and the conductive layer body, so as to prepare a current collector having a protective layer (the protective layer is located between the insulation layer and the conductive layer body). In addition, on the basis of the above, another protective layer is further formed on a surface of the conductive layer body away from the insulation layer by means of vapor deposition method, in-situ formation, or coating, so as to prepare a current collector having the protective layers (the protective layers are located on two opposite surfaces of the conductive layer body).

(3) A protective layer is firstly formed on a surface of the conductive layer body by means of vapor deposition, in-situ formation, or coating, and then the conductive layer body provided with the above protective layer is arranged on a surface of the insulation layer by means of mechanical rolling or bonding, and the protective layer is arranged on a surface of the conductive layer body away from the insulation layer, so as to prepare a current collector having an protective layer (the protective layer is located on the surface of the conductive layer body facing away from the insulation layer).

(4) A protective layer is firstly formed on two surfaces of the conductive layer body by means of vapor deposition, in-situ formation, or coating, and then the conductive layer body provided with the above protective layer is arranged on the surface of the insulation layer by means of mechanical rolling or bonding, so as to prepare a current collector having the protective layers (the protective layers are located on two opposite surfaces of the conductive layer body).

(5) On the basis of "Preparation of Current Collector" of Embodiment 1 above, moreover, another protective layer is formed on the surface of the conductive layer body away from the insulation layer by means of vapor deposition, in-situ formation, or coating, so as to prepare a current collector having the protective layer (the protective layer is located on the surface of the conductive layer body facing away from the insulation layer).

In the embodiments of preparation, the vapor deposition is vacuum evaporation, the in-situ formation is in-situ passivation, and the coating is blade coating.

The conditions of the vacuum evaporation are as follows: a sample is placed in a vacuum evaporation chamber after a surface cleaning treatment, a material of the protective layer in the evaporation chamber is melted and evaporated at a high temperature in a range of 1600° C. to 2000° C., and the evaporated material of the protective layer passes through a cooling system in the vacuum evaporation chamber and is finally deposited on a surface of the sample, so as to form the protective layer.

The conditions of the in-situ passivation are as follows: the conductive layer body is placed in a high-temperature oxidizing environment, the temperature is controlled within a range of 160° C. to 250° C., and the oxygen supply is maintained in the high-temperature environment, and processing time is 30 min, so as to form a protective layer of metal oxide.

The conditions of the gravure coating are as follows: a material of the protective layer and NMP are stirred and mixed, then the slurry of the above material of the protective layer (solid material content is 20% to 75%) is coated on a surface of the sample, the thickness of the coating is controlled by a gravure roll, and finally the coating is dried at 100 to 130° C.

The specific parameters of the obtained collector having the protective layer are shown in Table 2.

3. Preparation of Electrode Plate

A slurry of a positive active material (NCM) was coated on the surface of the positive current collector by a conventional battery coating process, and dried at 100° C. to obtain a positive electrode plate having the same compaction density (compaction density: 3.4 g/cm$^3$). The active material layer has a thickness of 55 μm.

A slurry of a negative active material (graphite) was coated on the surface of the negative current collector by a conventional battery coating process, and was dried at 100° C. to obtain a negative electrode plate having the same compaction density (compaction density: 1.6 g/cm$^3$). The negative active material layer has a thickness of 70 μm.

Conventional positive electrode plate: the current collector is an Al foil having a thickness of 12 μm, and the positive active material layer is a layer of Ternary (NCM) having a certain thickness.

Conventional negative electrode plate: the current collector is a Cu foil having a thickness of 8 μm, and the negative active material layer is a graphite material layer having a certain thickness.

The specific parameters of the electrode plates of the examples and comparative examples of the present disclosure are shown in Table 1 and Table 2.

4. Preparation of the Battery:

A positive electrode plate, a PP/PE/PP separator and a negative electrode plate are wound together to form a bare cell by a conventional battery manufacturing process, then the bare cell is placed into a battery case, an electrolyte (EC: EMC in a volume ratio of 3:7; LiPF$_6$, 1 mol/L) is injected into the case, followed by sealing, formation, and the like, so as to obtain a lithium ion secondary battery (hereinafter referred to as a battery).

Specific compositions of the battery prepared in the embodiments of the present disclosure and the batteries of the comparative examples are shown in Table 3.

TABLE 1

| Electrode plate No. | Current collector No. | Insulation layer Material | D1 | Conductive layer Material | D2 | Thickness of current collector | Weight percent of current collector |
|---|---|---|---|---|---|---|---|
| Positive Electrode plate 1# | Positive current collector 1# | PI | 6 μm | Al | 300 nm | 6.6 μm | 30.0% |
| Positive Electrode plate 2# | Positive current collector 2# | PET | 4 μm | Al | 500 nm | 5 μm | 24.3% |
| Positive Electrode plate 3# | Positive current collector 3# | PET | 2 μm | Al | 200 nm | 2.4 μm | 11.3% |
| Conventional Positive electrode plate | Conventional positive current collector | / | / | Al | / | 12 μm | 100% |
| Negative Electrode plate 1# | Negative current collector 1# | PET | 5 μm | Cu | 500 nm | 6 μm | 21.6% |
| Negative Electrode plate 2# | Negative current collector 2# | PI | 2 μm | Cu | 800 nm | 3.6 μm | 23.8% |
| Negative Electrode plate 3# | Negative current collector 3# | PET | 8 μm | Cu | 1 μm | 10 μm | 39.6% |

TABLE 1-continued

| Electrode plate No. | Current collector No. | Insulation layer Material | D1 | Conductive layer Material | D2 | Thickness of current collector | Weight percent of current collector |
|---|---|---|---|---|---|---|---|
| Negative electrode plate 4# | Negative current collector 4# | PET | 6 μm | Cu | 1.5 μm | 9 μm | 48.5% |
| Negative electrode plate 5# | Negative current collector 5# | PET | 4 μm | Cu | 1.2 μm | 6.4 μm | 37.3% |
| Negative electrode plate 6# | Negative current collector 6# | PET | 10 μm | Cu | 200 nm | 10.4 μm | 23.3% |
| Comparative negative electrode plate | Comparative negative current collector | PI | 8 μm | Cu | 2 μm | 12 μm | 65.3% |
| Conventional negative electrode plate | Conventional negative current collector | / | / | Cu | / | 8 μm | 100% |

TABLE 2

| Electrode plate No. | Current collector No. | Upper protective layer Material | D3' | Lower protective layer Material | D3" |
|---|---|---|---|---|---|
| Negative electrode plate 4-1# | Negative current collector 4-1# | / | / | Nickel | 1 nm |
| Negative electrode plate 4-2# | Negative current collector 4-2# | / | / | Nickel | 10 nm |
| Negative electrode plate 4-3# | Negative current collector 4-3# | / | / | Nickel-based alloy | 50 nm |
| Negative electrode plate 4-4# | Negative current collector 4-4# | / | / | Nickel | 200 nm |
| Negative electrode plate 4-5# | Negative current collector 4-5# | Nickel | 5 nm | / | / |
| Negative electrode plate 4-6# | Negative current collector 4-6# | Nickel-based alloy | 100 nm | / | / |
| Negative electrode plate 4-7# | Negative current collector 4-7# | Nickel | 5 nm | Nickel | 10 nm |
| Negative electrode plate 4-8# | Negative current collector 4-8# | Nickel | 10 nm | Nickel | 10 nm |
| Negative electrode plate 4-9# | Negative current collector 4-9# | Nickel | 50 nm | Nickel | 50 nm |
| Negative electrode plate 4-10# | Negative current collector 4-10# | Nickel | 100 nm | Nickel | 50 nm |
| Negative electrode plate 4-11# | Negative current collector 4-11# | Nickel | 200 nm | Nickel | 100 nm |

"/" indicates that no protective layer is provided. The nickel-based alloy is an alloy formed by nickel and chromium in a mass ratio of 9:1.

TABLE 3

| Battery No. | Composition of the electrode plate | |
|---|---|---|
| Battery 1# | Conventional negative electrode plate | Conventional positive electrode plate |
| Battery 2# | Conventional negative electrode plate | Positive electrode plate 1# |
| Battery 3# | Negative electrode plate 1# | Conventional positive electrode plate |
| Battery 4# | Negative electrode plate 2# | Conventional positive electrode plate |
| Battery 5# | Negative electrode plate 3# | Conventional positive electrode plate |
| Battery 6# | Negative electrode plate 4# | Conventional positive electrode plate |
| Battery 7# | Negative electrode plate 5# | Conventional positive electrode plate |
| Battery 8# | Negative electrode plate 6# | Conventional positive electrode plate |
| Battery 9# | Negative electrode plate 4-1# | Conventional positive electrode plate |
| Battery 10# | Negative electrode plate 4-2# | Conventional positive electrode plate |
| Battery 11# | Negative electrode plate 4-3# | Conventional positive electrode plate |
| Battery 12# | Negative electrode plate 4-4# | Conventional positive electrode plate |
| Battery 13# | Negative electrode plate 4-5# | Conventional positive electrode plate |
| Battery 14# | Negative electrode plate 4-6# | Conventional positive electrode plate |

TABLE 3-continued

| Battery No. | Composition of the electrode plate | |
| --- | --- | --- |
| Battery 15# | Negative electrode plate 4-7# | Conventional positive electrode plate |
| Battery 16# | Negative electrode plate 4-8# | Conventional positive electrode plate |
| Battery 17# | Negative electrode plate 4-9# | Conventional positive electrode plate |
| Battery 18# | Negative electrode plate 4-10# | Conventional positive electrode plate |
| Battery 19# | Negative electrode plate 4-11# | Conventional positive electrode plate |

Experimental Examples:

1. Experiment of Cycle Life:

A method for testing cycle life of the lithium ion battery was performed as follows.

A lithium ion battery was charged and discharged at 45° C., that is, it was firstly charged with a current of 1C to a voltage of 4.2V, then discharged with a current of 1C to a voltage of 2.8V, and the discharge capacity after a first cycle was recorded; and the battery was subjected to 1000 cycles of 1C/1C charging-discharging, and the discharge capacity of the battery after a $1000^{th}$ cycle was recorded. A capacity retention rate after the $1000^{th}$ cycle was obtained by dividing the discharge capacity after the $1000^{th}$ cycle by the discharge capacity after the first cycle.

The experimental results are shown in Table 4.

2. Rate Experiment

A rate experiment was performed for the lithium ion battery. The specific test method was performed as follows.

The lithium ion battery was charged and discharged at 25° C., i.e., the battery was firstly charged with a current of 1C to a voltage of 4.2V, and then was discharged with a current of 1C to a voltage of 2.8V. The discharge capacity after the first cycle was recorded and divided by the discharge capacity at 25° C. with 1C/1C charge-discharge after the first cycle to obtain a 4 C rate performance of the battery.

The experimental results are shown in Table 4.

TABLE 4

| Battery No. | Capacity retention ratio after the $1000^{th}$ cycle at 45° C. | 4 C rate performance |
| --- | --- | --- |
| Battery 1# | 85.4% | 45.1% |
| Battery 2# | 85.3% | 45.3% |
| Battery 3# | 85.7% | 45.4% |
| Battery 4# | 85.9% | 46.1% |
| Battery 5# | 86.0% | 46.3% |
| Battery 6# | 86.3% | 46.8% |
| Battery 7# | 86.1% | 46.2% |
| Battery 8# | 85.0% | 45.6% |
| Battery 9# | 86.3% | 46.5% |
| Battery 10# | 86.7% | 46.6% |
| Battery 11# | 86.5% | 46.0% |
| Battery 12# | 87.1% | 47.4% |
| Battery 13# | 86.5% | 46.4% |
| Battery 14# | 86.7% | 46.1% |
| Battery 15# | 87.2% | 47.3% |
| Battery 16# | 87.6% | 47.5% |
| Battery 17# | 87.8% | 47.7% |
| Battery 18# | 88.0% | 48.1% |
| Battery 19# | 88.3% | 48.6% |

It can be seen from Tables 1 and 2 that the weights of the positive electrode collector and the negative current collector adopting the present disclosure are greatly reduced. In the condition where the tensile strength and elongation at break of the current collector meet the use requirements, the weight percentage of the positive current collector is 30% or smaller of the conventional positive current collector, and the weight percentage of the negative current collector is 50% or smaller of the conventional negative current collector. According to the weight percentages of the comparative negative electrode electrodes, when the thickness of the conductive layer is greater than 1.5 μm, the effect of reducing the weight of the current collector is limited, and the overall thickness of the current collector cannot be effectively reduced. Although the thicknesses of the negative current collector 3# and the negative current collector 4# were not reduced, their weights were greatly reduced. The thicknesses and weights of the negative current collector 1#, the negative current collector 2#, and the negative current collector 5# are all reduced, so that both the volume energy density and the weight energy density of the battery can be increased.

According to the results in Table 4, compared with Battery 1# using the conventional positive electrode plate and the conventional negative electrode plate, the battery using the current collector according to the embodiments of the present disclosure has good cycle performance, which is equivalent to the cycle performance of the conventional battery. This shows that the current collectors according to the embodiments of the present disclosure do not have any significant adverse effects on the resulting electrode plates and batteries. In particular, the battery prepared by the current collector provided with the protective layer can have a further improved capacity retention rate, indicating a better reliability of the battery.

Although the present disclosure is disclosed with the preferred embodiments as above, it is not intended to limit the claims. Any person skilled in the art can make some possible changes and modifications without departing from the concept of the present disclosure. Therefore, the protection scope of the present disclosure shall be defined by the scope of the claims in this application.

What is claimed is:

1. A current collector, comprising: an insulation layer and a conductive layer, wherein the insulation layer is used to support the conductive layer, and the conductive layer is used to support an electrode active material layer and is located on at least one surface of the insulation layer, the insulation layer has a density smaller than a density of the conductive layer, the insulation layer has a thickness of D1 satisfying 1 μm≤D1≤10 μm, the conductive layer has a thickness of D2 satisfying 200 nm≤D2≤1.5 μm, the insulation layer has a tensile strength greater than or equal to 150 MPa, the conductive layer has a resistivity smaller than or equal to $8.0 \times 10^{-8}$ Ω·m, wherein the conductive layer comprises a conductive layer body, an upper metal protective layer located on a surface of the conductive layer body facing away from the insulation layer, and a lower metal protective layer located on a surface of the conductive layer body facing towards the insulation layer, and the upper metal protective layer and the lower metal protective layer are made of nickel, and wherein the upper metal protective layer has a thickness of D3' and the lower metal protective layer has a thickness of D3", D3' and D3" satisfy ½ D3'≤D3"≤⅘ D3', and 100 nm≤D3'≤200 nm.

2. The current collector according to claim 1, wherein D1 satisfies 1 μm≤D1≤5 μm.

3. The current collector according to claim 2, wherein the insulation layer has a thermal shrinkage at 200° C. smaller than or equal to 1.5%.

4. The current collector according to claim 2, wherein D1 satisfies 1 µm≤D1≤3 µm.

5. The current collector according to claim 1, wherein a bonding force between the insulation layer and the conductive layer is F, and F satisfies F≥400 N/m.

6. The current collector according to claim 1, wherein the insulation layer has a thermal shrinkage at 200° C. smaller than or equal to 1.5%.

7. The current collector according to claim 1, wherein D2 satisfies 200 nm≤D2≤1 µm.

8. The current collector according to claim 7, wherein D2 satisfies 200 nm≤D2≤900 nm.

9. The current collector according to claim 7, wherein the conductive layer is made of a material selected from a group consisting of a metal conductive material, a carbon-based conductive material and combinations thereof, the metal conductive material is at least one of aluminum, copper, nickel, titanium, silver, nickel copper alloy and aluminum zirconium alloy, and the carbon-based conductive material is at least one of graphite, acetylene black, graphene and carbon nanotube.

10. The current collector according to claim 1, wherein the conductive layer body is made of a material selected from a group consisting of a metal conductive material, a carbon-based conductive material, and combinations thereof, the metal conductive material is at least one of aluminum, copper, nickel, titanium, silver, nickel copper alloy, aluminum zirconium alloy, and combinations thereof, and the carbon-based conductive material is at least one of graphite, acetylene black, graphene and carbon nanotube.

11. The current collector according to claim 10, wherein the thickness of D3' satisfies D3'≤1/10 D2, or the thickness of D3" satisfies D3"≤1/10 D2 and 1 nm≤D3"≤200 nm.

12. The current collector according to claim 6, wherein the thickness of D3" satisfies 50 nm≤D3"≤100 nm.

13. The current collector according to claim 1, wherein the insulation layer has an elongation at break in a range from 16% to 120%.

14. The current collector according to claim 1, wherein the insulation layer is made of an organic polymer insulation material, and the organic polymer insulation material is at least one of polyamide, polyethylene terephthalat, polyimide, polyethylene, polypropylene, polystyrene, polyvinyl chloride, acrylonitrile-butadiene-styrene copolymer, polybutylene terephthalate, poly-p-phenylene terephthamide, ethylene propylene rubber, polyformaldehyde, epoxy resin, phenol-formaldehyde resin, polytetrafluoroethylene, polyvinylidene fluoride, silicone rubber and polycarbonate.

15. An electrode plate, comprising the current collector according to claim 1 and an electrode active material layer formed on a surface of the current collector.

16. An electrochemical device, comprising a positive electrode plate, a separator and a negative electrode plate, wherein the positive electrode plate and/or the negative electrode plate is the electrode plate according to claim 15.

17. A current collector, comprising: an insulation layer and a conductive layer, wherein the insulation layer is used to support the conductive layer, and the conductive layer is used to support an electrode active material layer and is located on at least one surface of the insulation layer, the insulation layer has a density smaller than a density of the conductive layer, the insulation layer has a thickness of D1 satisfying 1 µm≤D1≤10 µm, the conductive layer has a thickness of D2 satisfying 200 nm≤D2≤1.5 µm, the insulation layer has a tensile strength greater than or equal to 150 MPa, the conductive layer has a resistivity smaller than or equal to $8.0 \times 10^{-8}$ Ω·m, wherein the conductive layer comprises a conductive layer body, an upper metal protective layer located on a surface of the conductive layer body facing away from the insulation layer, and a lower metal protective layer located on a surface of the conductive layer body facing towards the insulation layer, and the upper metal protective layer and the lower metal protective layer are made of nickel or nickel-based alloy, and wherein the upper metal protective layer has a thickness of D3' and the lower metal protective layer has a thickness of D3", D3' and D3" satisfy ½ D3'≤D3"≤⅘ D3', and 100 nm≤D3'≤200 nm, and a bonding force between the insulation layer and the conductive layer is F, and F satisfies F≥400 N/m.

* * * * *